United States Patent
Liang et al.

(10) Patent No.: US 9,785,428 B2
(45) Date of Patent: Oct. 10, 2017

(54) INTERNAL SOFTWARE UPDATING METHOD AND SYSTEM

(71) Applicant: UC MOBILE LIMITED, Beijing (CN)

(72) Inventors: Jie Liang, Beijing (CN); Yongfu Yu, Beijing (CN); Xiaopeng He, Beijing (CN); Shunyan Zhu, Beijing (CN); Weizhong Jiang, Beijing (CN)

(73) Assignee: UC MOBILE LIMITED, Beijing (CN)

( * ) Notice: Subject to any disclaimer, the term of this patent is extended or adjusted under 35 U.S.C. 154(b) by 0 days.

(21) Appl. No.: 14/361,413

(22) PCT Filed: May 30, 2013

(86) PCT No.: PCT/CN2013/076508
§ 371 (c)(1),
(2) Date: May 29, 2014

(87) PCT Pub. No.: WO2013/189236
PCT Pub. Date: Dec. 27, 2013

(65) Prior Publication Data
US 2015/0154016 A1 Jun. 4, 2015

(30) Foreign Application Priority Data

Jun. 19, 2012 (CN) .......................... 2012 1 0208900

(51) Int. Cl.
G06F 9/44 (2006.01)
G06F 9/445 (2006.01)
H04L 29/08 (2006.01)
H04W 4/00 (2009.01)

(52) U.S. Cl.
CPC .................. *G06F 8/67* (2013.01); *G06F 8/65* (2013.01); *H04L 67/04* (2013.01); *H04L 67/10* (2013.01); *H04L 67/34* (2013.01); *H04W 4/001* (2013.01); *Y02B 60/183* (2013.01)

(58) Field of Classification Search
CPC ........................................................ G06F 8/65
(Continued)

(56) References Cited

U.S. PATENT DOCUMENTS

2009/0191925 A1* 7/2009 Moseler et al. .............. 455/573
2011/0231834 A1 9/2011 Kim
2012/0167071 A1* 6/2012 Paek ............................. 717/170

FOREIGN PATENT DOCUMENTS

CN 1450827 A 10/2003
CN 101167342 A 4/2008
(Continued)

OTHER PUBLICATIONS

"How to Hide the Notification Badges for Settings, App Store, and Cydia on Your iOS Home Screen"; Lifehacker website (lifehacker.com) as captured by the Wayback Machine Internet Archive (archive.org) on Apr. 13, 2012.*

(Continued)

*Primary Examiner* — Qing Chen
*Assistant Examiner* — Clint Thatcher
(74) *Attorney, Agent, or Firm* — Anova Law Group, PLLC

(57) ABSTRACT

An internal software updating method, apparatus, system, mobile terminal, and computer-readable storage medium are provided. According to methods in the embodiments of the present invention, a network connection condition between the mobile terminal and a server and a current running mode of the mobile terminal in a regular time interval is detected and, according to the detected network connection condition and the running mode of the mobile terminal, it is determined whether to perform an update processing on the internal software installed in the mobile terminal.

20 Claims, 3 Drawing Sheets

(58) Field of Classification Search
USPC .......................................................... 717/169
See application file for complete search history.

(56) References Cited

FOREIGN PATENT DOCUMENTS

| CN | 101694621 A | 4/2010 |
|---|---|---|
| CN | 101951404 A | 1/2011 |
| CN | 102123170 A | 7/2011 |
| CN | 102185972 A | 9/2011 |
| CN | 102799447 A | 11/2012 |
| JP | 2002111573 A | 4/2002 |
| JP | 3669619 B2 | 7/2005 |

OTHER PUBLICATIONS

"How to Update iPhone Apps Via iTunes"; eHow website (ehow.com) as captured by the Wayback Machine Internet Archive (archive.org) on Oct. 30, 2011.*

"How to Make Android Apps Update Via Wi-Fi Only"; TechLogon website (techlogon.com); Dec. 20, 2011.*

"How can I avoid the battery charging when connected via USB?"; StackExchange website (stackexchange.com); Jan. 13, 2012.*

"Customizing the package list"; Debian OS website (aptitude.alioth.debian.org); Aug. 29, 2004.*

"My battery is too low to update my phone"; Windows Phone help pages (windowsphone.com); Oct. 17, 2010.*

Alexandra Chang;"7 Apps for Mastering Your Mobile Data Usage"; Wired.com website; May 2, 2012.*

"Polling (computer Science)"; Wikipedia.org online encyclopedia website; May 12, 2010.*

"Do You Have to Plug Your Phone in Anymore for Software Updates?"; iMore forum website (forums.imore.com); Mar. 18, 2012.*

"How to Set a Data Usage Limit?"; ASUS website(www.asus.com); Nov. 17, 2011.*

"Disable Update on Battery Percentage"; Stack Overflow website (stackoverflow.com); Mar. 18, 2012.*

* cited by examiner

INTERNAL SOFTWARE UPDATING METHOD AND SYSTEM

FIELD OF THE INVENTION

The present invention generally relates to mobile communication field and, more particularly, to an internal software updating method and system.

BACKGROUND

In today's technologies, the software update processing of a mobile terminal (e.g. smart phone, tablet computer) is generally performed in the following ways: manually updating by a mobile user; through an update detecting button built in the installed software; or manually updating by a user upon the software update alerts pushed out by the third party software publishing retailer or the system software retailer.

All of the above approaches require the new installation package to be downloaded from the software publishing server to a mobile terminal itself, and to be installed. The process flow is given below: receiving a software update alert→confirming deliberately the update software by a user→downloading the update software through a network→confirming the installation→completing the installation→updating, installing the next software. However, downloading the installation packages relies on the network connection. For example, in a 2G/3G era network, updating software on mobile terminal implies expensive charge on data volume, at the meantime it is subjected to the curbing of network downloading speed as well.

Not only so, besides the data volume expended while downloading the software update packages through the network by the mobile terminal, the battery power of the mobile terminal is also consumed. In order to update the software on mobile terminal, it forces the user to charge or replace the battery frequently and adds extra burden on the user.

BRIEF SUMMARY OF THE DISCLOSURE

The purposes of the present invention include to solve at least one of the problems in the existing technologies.

The present invention provides an internal software updating method, system, apparatus, mobile terminal, and computer readable storage medium to solve at least the problem of costly network data volume and battery power consumption occurred during the software updating in mobile terminal in the existing technologies One aspect of the present disclosure provides an internal software updating method on a mobile terminal.

The internal software updating method disclosed in the present invention includes: detecting in a regular time internal the network connection condition between the mobile terminal and a server and the running mode of the mobile terminal; according to the detected network connection condition and the running mode of the mobile terminal, determining whether to perform the update processing on the internal software installed in the mobile terminal.

According to one embodiment of the present invention, determining whether to perform the update processing on the internal software installed in the mobile terminal according to the detected network connection condition and the running mode of the mobile terminal includes: detecting whether the mobile terminal is connected to the server through a Wi-Fi network; detecting whether the mobile terminal is in the battery charging mode; and when the mobile terminal is connected to the server through a Wi-Fi network and in the battery charging mode; and performing the update processing on the internal software installed in the mobile terminal.

According to one embodiment of the present invention, performing the update processing on the internal software installed in the mobile terminal includes: receiving by the server a software update request from the mobile terminal, wherein the software update request carries a name and a version number of a to-be-updated software; determining by the server a version number of a corresponding update software stored in the server according to the name of the to-be-updated software; comparing the version number determined by the server with the version number received by the server; and when the two version number are not the same, delivering by the server an update package corresponding to the to-be-updated software to the mobile terminal, wherein the mobile terminal performs the update processing on the to-be-updated software according to the update package.

According to one embodiment of the present invention, performing the update processing on the to-be-updated software according to the update package further includes: receiving by the mobile terminal the update package from the server and storing the received update package; rearranging by the mobile terminal corresponding update package of each to-be-updated software in an order of updating time of each to-be-updated software; and sequentially installing by the mobile terminal the update package corresponding to each to-be-updated software in the rearranged order.

According to one embodiment of the present invention, determining whether to perform the update processing on the internal software installed in the mobile terminal according to the detected network connection condition and the running mode of the mobile terminal further includes: displaying an indication message on the mobile terminal when the mobile terminal is not connected through a Wi-Fi network to the server or the mobile terminal is not in the charging mode, wherein the indication message is used to indicate that software in the mobile terminal needs to be updated.

According to one embodiment of the present invention, determining whether to perform the update processing on the internal software installed in the mobile terminal according to the detected network connection condition and the running mode of the mobile terminal further includes: determining whether the mobile terminal is connected to the server by a Wi-Fi network; determining whether the mobile terminal has sufficient battery power to sustain a complete download of update packages of the internal software installed in the mobile terminal; and performing the update processing on the internal software installed in the mobile terminal when the mobile terminal is connected to a server through the Wi-Fi network and the mobile terminal has sufficient battery power to sustain the complete download of the update package of the internal software installed in the mobile terminal.

Another aspect of the present disclosure provides an internal software updating system. The internal software updating system of the present invention includes a mobile terminal. The mobile terminal includes a detecting module configured to detect a network connection condition between the mobile terminal and a server and a current running mode of the mobile terminal in a regular time interval; and a first determining module configured to determine whether to perform an update processing on the internal software installed in the mobile terminal according to the detected network connection condition and the running mode of the mobile terminal.

According to one embodiment of the present invention, the first determining module includes a first determining unit configured to determine whether the mobile terminal is connected to the server through a Wi-Fi network; a second determining unit configured to determine whether the mobile terminal is in a charging mode; and a first updating unit configured to perform the update processing on the internal software installed in the mobile terminal when the mobile terminal is connected to the server through a Wi-Fi network and the mobile terminal is in the charging mode.

According to one embodiment of the present invention, the above system also include a server, and the server includes: a first receiving module configured to receive a software update request from the mobile terminal, wherein the software update request carries a name and a version number of a to-be-updated software; a second determining module configured to determine a version number of a corresponding update software stored in the server according to the name of the to-be-updated software; a comparison module configured to compare the version number determined by the server with the version number received by the server; a delivering module configured to, when the two version number are not the same, an update package corresponding to the to-be-updated software to the mobile terminal. The mobile terminal performs the update processing on the to-be-updated software according to the update package According to one embodiment of the present invention, the mobile terminal further includes: a second receiving module configured to receive the update package from the server and to store the received update package; a sorting module configured to rearrange corresponding update package of each to-be-updated software in an order of updating time of each to-be-updated software; and an installation module configured to sequentially install the update package corresponding to each to-be-updated software in the rearranged order.

According to one embodiment of the present invention, the mobile terminal also includes a display module configured to display an indication message on the mobile terminal when the mobile terminal is not connected through a Wi-Fi network to the server or the mobile terminal is not in the charging mode, wherein the indication message is used to indicate that software in the mobile terminal needs to be updated.

According to one embodiment of the present invention, the first determining module also includes: a third determining unit configured to determine whether the mobile terminal is connected to the server by a Wi-Fi network; a fourth determining unit configured to determine whether the mobile terminal has sufficient battery power to sustain a complete download of update packages of the internal software installed in the mobile terminal; and a second updating unit configured to perform the update processing on the internal software installed in the mobile terminal when the mobile terminal is connected to a server through the Wi-Fi network and the mobile terminal has sufficient battery power to sustain the complete download of the update package of the internal software installed in the mobile terminal.

Another aspect of the present disclosure provides an internal software updating apparatus. The apparatus includes: a detecting module configured to detect a network connection condition between a mobile terminal and a server and a current running mode of the mobile terminal in a regular time interval; a first determining module configured to determine whether to perform an update processing on the internal software installed in the mobile terminal according to the detected network connection condition and the running mode of the mobile terminal and, when the detected network connection condition and the running mode of the mobile terminal allow updating the internal software, to perform the update processing on the internal software installed in the mobile terminal.

According to one embodiment of the present invention, the first determining module includes: a first determining unit configured to determine whether the mobile terminal is connected to the server through a Wi-Fi network; a second determining unit configured to determine whether the mobile terminal is in a charging mode; and a first updating unit configured to perform the update processing on the internal software installed in the mobile terminal when the mobile terminal is connected to the server through a Wi-Fi network and the mobile terminal is in the charging mode.

According to one embodiment of the present invention, the first updating unit sends a software update request to the server when the mobile terminal is connected to the server through a Wi-Fi network and the mobile terminal is in the charging mode, wherein the software update request carries a name and a version number of a to-be-updated software;

According to one embodiment of the present invention, the apparatus further includes: a second receiving module configured to receive the update package from the server and to store the received update package; a sorting module configured to rearrange corresponding update package of each to-be-updated software in an order of updating time of each to-be-updated software; and an installation module configured to sequentially install the update package corresponding to each to-be-updated software in the rearranged order.

According to one embodiment of the present invention, the apparatus further includes a display module configured to display an indication message on the mobile terminal when the mobile terminal is not connected through a Wi-Fi network to the server or the mobile terminal is not in the charging mode, wherein the indication message is used to indicate that software in the mobile terminal needs to be updated.

According to one embodiment of the present invention, the first determining module also includes: a third determining unit configured to determine whether the mobile terminal is connected to the server by a Wi-Fi network; a fourth determining unit configured to determine whether the mobile terminal has sufficient battery power to sustain a complete download of update packages of the internal software installed in the mobile terminal; and a second updating unit configured to perform the update processing on the internal software installed in the mobile terminal when the mobile terminal is connected to a server through the Wi-Fi network and the mobile terminal has sufficient battery power to sustain the complete download of the update package of the internal software installed in the mobile terminal.

Another aspect of the present invention provides a non-transitory computer-readable medium. The computer-readable medium contains program instruction. When the instructions are executed on the mobile terminal, the following operations can be realized on the mobile terminal: detecting a network connection condition between the mobile terminal and a server and a current running mode of the mobile terminal in a regular time interval; determining whether to perform an update processing on the internal software installed in the mobile terminal according to the detected network connection condition and the running mode of the mobile terminal; and when the detected network connection condition and the running mode of the mobile terminal allow updating the internal software, performing the update processing on the internal software installed in the mobile terminal.

According to one embodiment of the present invention, determining whether to perform the update processing on the internal software installed in the mobile terminal according to the detected network connection condition and the running mode of the mobile terminal further includes: determining whether the mobile terminal is connected to the server through a Wi-Fi network; determining whether the mobile terminal is in a charging mode; and performing the update processing on the internal software installed in the mobile terminal when the mobile terminal is connected to the server through a Wi-Fi network and the mobile terminal is in the charging mode.

According to one embodiment of the present invention, performing the update processing on the internal software installed in the mobile terminal further includes: receiving, by the server, a software update request from the mobile terminal, wherein the software update request carries a name and a version number of a to-be-updated software; determining, by the server, a version number of a corresponding update software stored in the server according to the name of the to-be-updated software; comparing the version number determined by the server with the version number received by the server; and when the two version number are not the same, delivering, by the server, an update package corresponding to the to-be-updated software to the mobile terminal, wherein the mobile terminal performs the update processing on the to-be-updated software according to the update package.

According to one embodiment of the present invention, performing the update processing on the internal software installed in the mobile terminal further includes: receiving, by the mobile terminal, the update package from the server and storing the received update package; rearranging, by the mobile terminal, corresponding update package of each to-be-updated software in an order of updating time of each to-be-updated software; and sequentially installing, by the mobile terminal, the update package corresponding to each to-be-updated software in the rearranged order.

According to one embodiment of the present invention, determining whether to perform the update processing on the internal software installed in the mobile terminal according to the detected network connection condition and the running mode of the mobile terminal further includes: displaying an indication message on the mobile terminal when the mobile terminal is not connected through a Wi-Fi network to the server or the mobile terminal is not in the charging mode, wherein the indication message is used to indicate that software in the mobile terminal needs to be updated.

According to one embodiment of the present invention, determining whether to perform the update processing on the internal software installed in the mobile terminal according to the detected network connection condition and the running mode of the mobile terminal further includes: determining whether the mobile terminal is connected to the server by a Wi-Fi network; determining whether the mobile terminal has sufficient battery power to sustain a complete download of update packages of the internal software installed in the mobile terminal; and performing the update processing on the internal software installed in the mobile terminal when the mobile terminal is connected to a server through the Wi-Fi network and the mobile terminal has sufficient battery power to sustain the complete download of the update package of the internal software installed in the mobile terminal.

Another aspect of the present invention provides a mobile terminal. The mobile terminal includes: one or more processors and memory. The memory is configured to store one or more programs arranged to be executed by the one or more processors, and the programs include instructions for: detecting a network connection condition between the mobile terminal and a server and a current running mode of the mobile terminal in a regular time interval; determining whether to perform an update processing on the internal software installed in the mobile terminal according to the detected network connection condition and the running mode of the mobile terminal; and when the detected network connection condition and the running mode of the mobile terminal allow updating the internal software, performing the update processing on the internal software installed in the mobile terminal.

According to the present invention, at each preset time interval, by simultaneously detecting a network connection condition between the mobile terminal and a server and a current running mode of the mobile terminal and determining whether to perform an update processing on the internal software installed in the mobile terminal according to the detected results, the problems of costing data volume and battery power consumption when updating the software update on a mobile terminal can be solved and, thus, it lowers the complexity for software updating and makes the software updating more energy efficient, more environmental friendly, and meeting user expectations.

Additional aspects and advantages of the present invention are illustrated in the following descriptions, which will become apparent from the following descriptions, or become understood by practicing the present invention.

BRIEF DESCRIPTION OF THE DRAWINGS

The above and/or additional aspects and advantages become more clear and easier to understand from the descriptions of the exemplary embodiments in combination with the following drawings. In the drawings.

DETAILED DESCRIPTION

Figure 1:
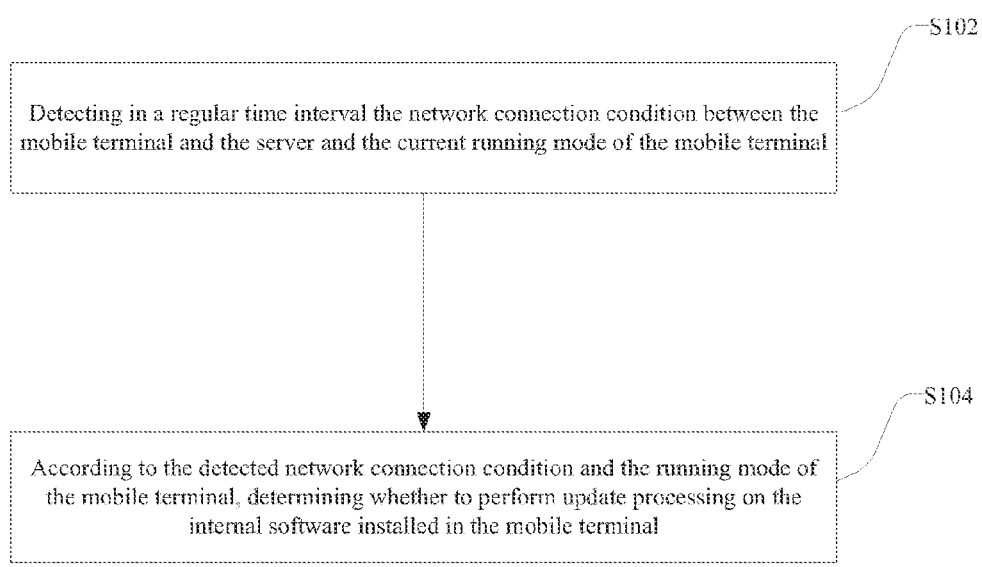
FIG. 1 illustrates a flow chart of an internal software updating method according to an embodiment of the present invention.

Embodiments of the present invention are described in detail below, with the examples of the embodiments shown in the accompanying drawings. Throughout this disclosure, the same or similar reference numerals denote the same or similar elements or elements having similar functions. The embodiments described below with reference to the drawings are for exemplary purposes and only used to explain the present invention and do not limit the present invention.

It should be noted that the term "first", "second", etc., is used for only descriptive purposes only, and should not be understood as to indicate or imply relative importance or quantities of specified technical features. Thus, a feature defined as the "first" or "second" may explicitly or implicitly include one or more of such feature. Further, in the description of the present invention, unless otherwise specified, "plurality" or "multiple" means two or more than two.

In addition, any process or method described in the following flowchart or described by other ways can be understood as to include one or more executable instruction code, module, segment, or part for implementing specific logical functions or process steps. The scope of preferred embodiments of the present invention may include other implementations which do not follow the order of execution shown or discussed, including executing the required functions in a order similar or opposite to the functionality involved, which should be understood by those with ordinary skill in the art related to the technical field of the embodiments of the present invention.

FIG. 1 illustrates a flow chart of an internal software updating method according to embodiment one of the present invention. As shown in FIG. 1, the method includes the following process steps:

Step S102: in a regular time internal, detecting the network connection condition between a mobile terminal and a server and the current running mode of the mobile terminal.

Step S104: according to the detected network connection condition and the current running mode of the mobile terminal, determining whether to perform internal software updating on the internal software installed in the mobile terminal. Further, when the mobile terminal and the server are in a connected state and the running mode of the mobile terminal allows for software updating, updating the internal software installed on the mobile terminal software.

In corresponding technologies, updating software on a mobile terminal consumes the data volume and the battery power of the mobile terminal. However, according to the internal software updating method illustrated in FIG. 1, a mobile terminal detects the network connection condition (e.g. 3G network) of the mobile terminal and its running mode (e.g. the current battery power level) at the same time, in a preset interval (e.g. every 6 hours). And based on the detected data, the mobile terminal determines whether to perform the internal software updating on the internal software installed in the mobile terminal. The disclosed method solve the data volume and battery power consumption problems occurred during the software update on the mobile terminal, lowers the complexity of the software update process, and makes the software update more energy efficient, more environmental friendly and meets user expectation.

In one embodiment, in Step S104, determining whether to perform the update processing on the internal software installed in the mobile terminal according to the detected network connection condition and the running mode of the mobile terminal also includes:

Step S1: detecting whether the mobile terminal is connected to the server through a Wi-Fi network; Step S2: detecting whether the mobile terminal is in charging mode; and Step S3: performing the update processing on the internal software installed in the mobile terminal when the mobile terminal is connected through a Wi-Fi network and meanwhile the mobile terminal is in the charging mode.

In one embodiment, the data volume occurred while using a mobile terminal in a non-Wi-Fi (Wireless Fidelity, abbreviated to WiFi) network to download the update package has to be paid. Therefore, in one embodiment of the present invention, the software update process is chosen to be performed under Wi-Fi network condition.

Meanwhile, the network resource download performed by a mobile terminal also consumes the battery power of the mobile terminal. For example: the network connection and the reading/writing of SD card both need to consume the battery power. However, in one embodiment, when a mobile terminal is in the charging mode, it may imply that the user leaves the mobile terminal in idle, and it may also indicate that the user does not need to use the mobile terminal in a hurry, so choosing the duration while the mobile terminal is in charging to perform the internal software update can save the mobile terminal's battery power.

In one embodiment, in STEP S3 described above, performing the update processing on the internal software installed in the mobile terminal may include the following steps: STEP S31: receiving by the server a software update request from the mobile terminal, wherein the software update request carries the name and the version number of the to-be-updated software; STEP S32: determining by the server the version number of the corresponding update software stored in the server according to the name of the to-be-updated software; STEP S33: comparing by the server the determined version number with the received version number; and STEP S34: if the version number is not the same, the server sends the corresponding software update package of the to-be-updated software to the mobile terminal, and the mobile terminal performs the update processing on the to-be-updated software according to the software update package.

In one embodiment, the server, after receiving the software update request from the mobile terminal, can obtain from the request message the name and the version number of the software that needs to be updated on the mobile terminal. For example: the name of the software which currently needs to be updated is UC browser with its current version as 8.2. The server can compare the latest version number of this software (e.g. version 8.3) with the version number reported by the mobile terminal. Because the version number is not the same, the server delivers the latest version update package to the mobile terminal.

In one embodiment, according to the update package, the mobile terminal performing the update processing on the to-be-updated software may include the following steps:

STEP S35: collecting and storing by the mobile terminal the update package from the server.

STEP S36: rearranging, by the mobile terminal, the corresponding update package of each to-be-updated software in the order of the updating time of each to-be-updated software.

STEP S37: installing in turn by the mobile terminal the corresponding update package of each to-be-updated software in the rearranged order.

In one embodiment, a download list can be created. The upgrade packages of the to-be-updated software are rearranged by the first letter of the Chinese (English) name of the software installed in the mobile terminal in alphabetical order or by the installation time of the software in a chronological order, and the rearranged update packages are then stored in a cache memory. Further, each to-be-updated software is upgraded one by one in the rearranged order.

In one embodiment, in STEP S104, according to the detected network connection condition and the running mode, determining by the mobile terminal whether to perform the update processing on the internal software installed in the mobile terminal may also include the following processes: while the mobile terminal is connected through a Wi-Fi network to the server and/or the mobile terminal is in charging mode, displaying by the mobile terminal an indication information or a prompt, which is used to indicate that there is software which needs to be updated.

In one embodiment, if the mobile terminal is not currently located in a Wi-Fi network environment or the mobile terminal is not in charging mode, downloading update packages at this time may be chargeable, and the download time may be increased due to the network condition, costing the network data volume. Meanwhile, during the download of the update packages, the battery power of the mobile terminal is consumed as well. If at the moment there is software which needs to be updated on the mobile terminal, an indication message is displayed on the screen of the mobile terminal to remind a user that there is software which needs to be upgraded, and guides the user to turn on Wi-Fi and plug the mobile terminal to a power adapter, or to update next time. Corresponding operations can then be executed according to the user's choice.

It should be noted that the update packages can also be downloaded in other network conditions or in a non-charging mode. For example: the user has purchased an unlimited monthly or yearly data plan. In the condition that there is plenty of data volume, the software update can be performed in a Non-Wi-Fi network connection. Meanwhile, if the battery power of the mobile terminal is above a preset threshold (e.g. 80%), software update can also be performed.

In one embodiment, in STEP S104, according to the detected network connection condition and the detected running mode, determining whether to perform the update processing on the internal software installed in the mobile terminal may also includes the following operations: STEP S4: determining whether the mobile terminal is connected through a Wi-Fi network to the server; STEP S5: according to the model or type of the mobile terminal, determining whether the mobile terminal has enough battery power to sustain the complete download of the corresponding update package of the internal software installed in the mobile terminal.

STEP S6: when the mobile terminal is connected to the server through a Wi-Fi network and the mobile terminal has enough battery power to sustain the complete download of the corresponding update package of the internal software installed in the mobile terminal, performing the update processing on the internal software installed in the mobile terminal.

In one embodiment, according to the model or type of the mobile terminal, the battery power consumed during the download of the corresponding update packages of the internal software installed in the mobile terminal can be estimated in advance. At the same time, the current battery power value of the mobile terminal needs to be obtained as well. When currently there is enough battery power to sustain the complete download of the corresponding update packages of the internal software installed in the mobile terminal, the update processing is performed on the to-be-updated software. If there is not enough battery power to sustain the complete download of the corresponding update packages of the internal software installed in the mobile terminal, the update processing is not performed.

Figure 2:
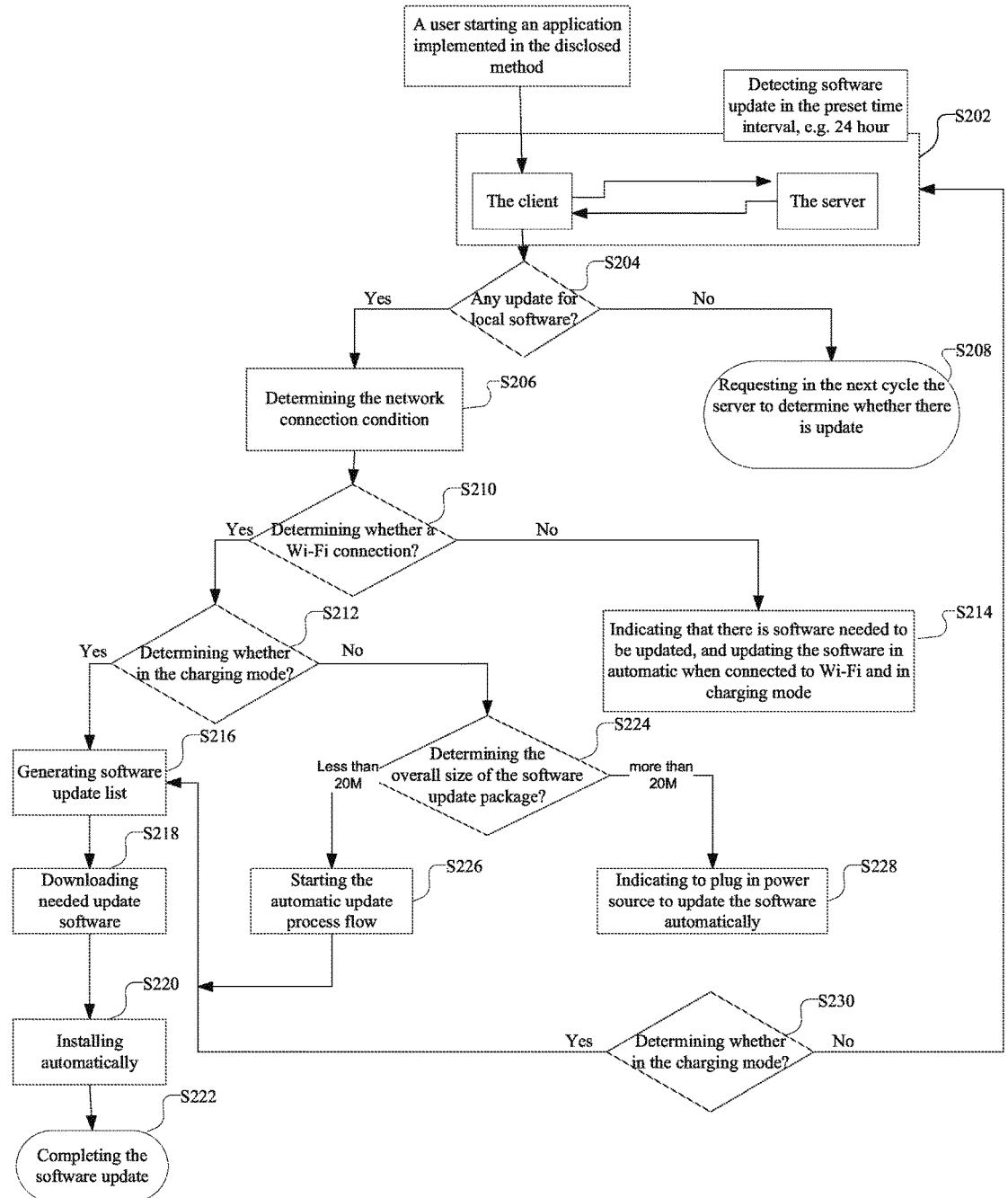
FIG. 2 illustrates a flow chart of an internal software updating method according to another embodiment of the present invention.

The followings, together with a preferred embodiment illustrated in FIG. 2, describe in further detail the above preferred implementation process.

FIG. 2 illustrates a flow chart of an internal software updating method according to one embodiment of the present invention. As shown in FIG. 2, the process may include the following steps.

STEP S202: the mobile terminal sets a detecting cycle or period and detects any software updating.

STEP 204: the mobile terminal determines whether there is an update for an internal software installed in the mobile terminal. If there is an update, the process proceeds to STEP S206; if there is not any update, the process goes to STEP S208.

STEP 206: the mobile terminal determines the current network connection condition; and the process then proceeds to STEP S210.

STEP 208: the mobile terminal again submits a software update request to the server in the next cycle.

STEP S210: the mobile terminal determines whether the mobile terminal is connected to the server through a Wi-Fi network. If the mobile terminal is connected through a Wi-Fi network, the process proceeds to STEP S212; otherwise if the mobile terminal is not connected through a Wi-Fi network, the process goes to STEP S214.

STEP S212: the mobile terminal determine whether the mobile terminal is in the charging mode. If the mobile terminal is in the charging mode, the process proceeds to STEP S216; otherwise, the process goes to STEP S224.

STEP S214: the mobile terminal displays an indication message on the mobile terminal's screen that software needs to be updated.

STEP S216: the mobile terminal generates a software update list.

STEP S218: the mobile terminal downloads the corresponding update packages of the to-be-updated software in order.

STEP S220: the mobile terminal automatically installs the downloaded update packages.

STEP S222: the mobile terminal completes the software updating, and the process ends.

STEP S224: the mobile terminal determines the size of the update packages using, for example, 20M as a threshold. The threshold is decided mainly by considering the battery power consumption factor. In general, the bandwidth of the Wi-Fi network is 2M, i.e. 200 k/s as the network speed. Therefore, it takes around 100 s, i.e. 2 minutes, to download a software update package with the size of 20M. The download of the package of such size consumes less battery power if it can be completed within the time described above. If the size of the update packages is less than 20M, then the process proceeds to STEP S226; if the size is larger than 20M, then the process goes to STEP S228.

STEP S226: starting the automatic updating process, and then proceeding to STEP S216.

STEP S228: the mobile terminal prompts the user to plug in a power adapter and automatically updates the software.

STEP S230: the mobile terminal determines whether the mobile terminal is currently in charging mode. If the mobile terminal is in the charging mode, the process goes to STEP S216; otherwise, the process proceeds to STEP S202.

Figure 3:
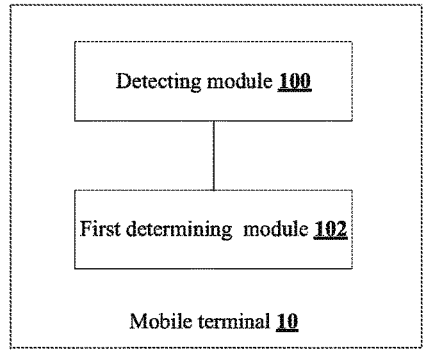
FIG. 3 illustrates a schematic diagram of an internal software updating system according to an embodiment of the present invention.

FIG. 3 illustrates a schematic diagram of an internal software updating system according to a disclosed embodiment of the present invention. As shown in FIG. 3, the system may include a mobile terminal 10 and a server 20 (illustrated below).

The mobile terminal 10 may includes: a detecting module 100 and a first determining module 102. The detecting module 100 is configured to detect the network connection condition between the mobile terminal and a server, as well as the running mode of the mobile terminal, in a regular time interval. The first determining module 102 is configured to determine whether to perform the update processing on the internal software installed in the mobile terminal according to the detected network connection condition and the running mode of the mobile terminal. In one embodiment, when the detected network connection condition and the running mode of the mobile terminal allow performing the software update processing, the first determining module 102 performs the update processing on the internal software installed in the mobile terminal.

The system, as illustrated in FIG. 3, solves the data volume and battery power consumption problems occurred during the software update on a mobile terminal in corresponding technologies and, hence, lowers the complexity for software updating and makes the software updating more energy efficient, more environmental friendly, and meeting user expectations.

Figure 4:
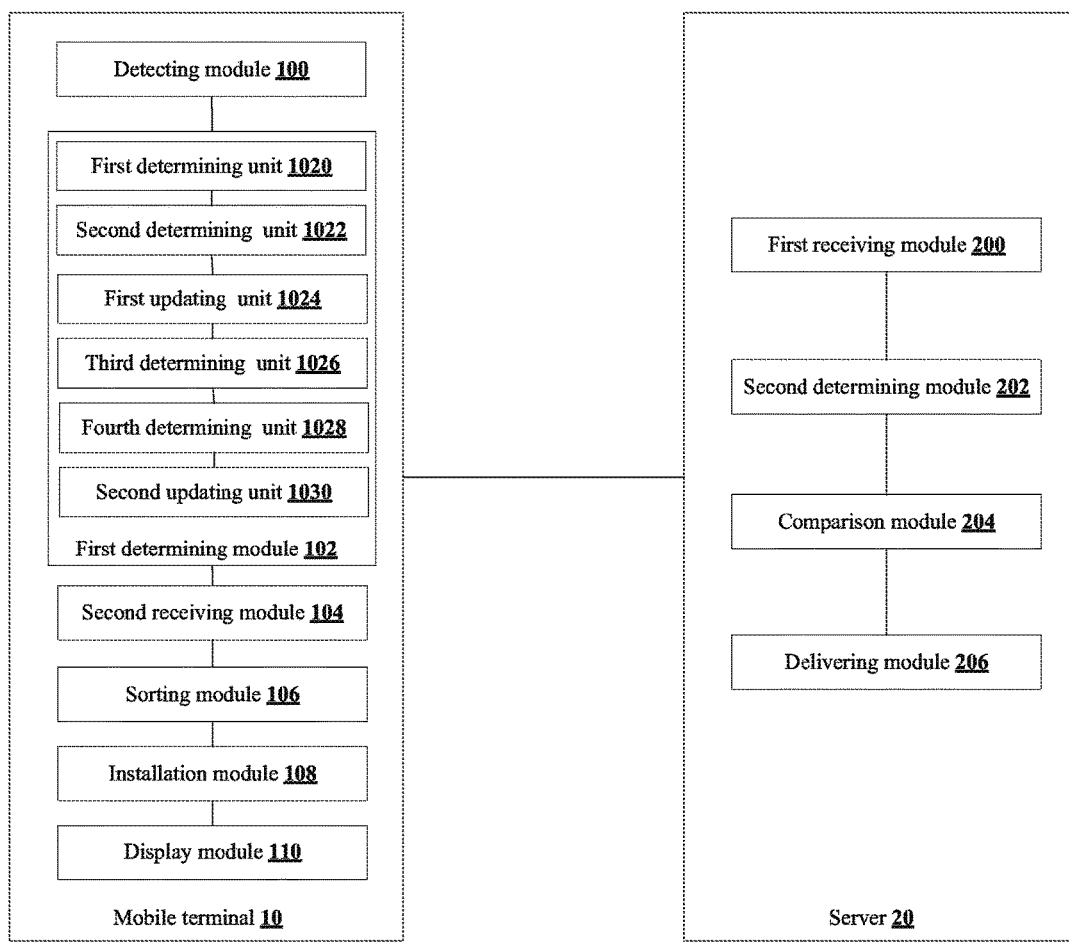
FIG. 4 illustrates a schematic diagram of an internal software updating system according to another embodiment of the present invention.

In one embodiment, as shown in FIG. 4, the first determining module 102 may includes: a first determining unit 1020, a second determining unit 1022, and a first updating unit 1024. The first determining module 1020 is configured to determine whether the mobile terminal is connected to the server through a Wi-Fi network. The second determining unit 1022 is configured to determine whether the mobile terminal is in the charging mode. And the first updating unit 1024 is configured to perform the update processing on the internal software installed in the mobile terminal when the mobile terminal is connected to the server through a Wi-Fi network and the mobile terminal is currently in the charging mode.

In one embodiment, as shown in FIG. 4, the system may also include: a server 20. The server 20 may include: a first receiving module 200, a second determining module 202, a comparison module 204 and a delivering module 206. The first receiving module 200 is configured to receive a software update request from the mobile terminal, wherein the software update request carries the name and the version number of a to-be-updated software. The second determining module 202 is configured to determine the version number of the corresponding update software stored in the server according to the name of the to-be-updated software. The comparison module 204 is configured to compare the determined software version number with the received software version number. The delivering module 206 is configured to pass on the corresponding update package of the to-be-updated software to the mobile terminal, wherein the mobile terminal performs the update processing on the to-be-updated software according to the update package.

In one embodiment, as shown in FIG. 4, the mobile terminal 10 may also include: a second receiving module 104, a sorting module 106 and an installation module 108. The second receiving module is configured to collect and store the update package from the server. The sorting module 106 is configured to rearrange the corresponding update package of each to-be-updated software in the order of the updating time of the to-be-updated software. The installation module 108 is configured to install sequentially the corresponding update package of each to-be-updated software in the rearranged order.

In one embodiment, as shown in FIG. 4, the mobile terminal 10 may also include: a display module 110. The display module 110 is configured to display an indication message when the mobile terminal is not connected to the server through a Wi-Fi network and/or the mobile terminal is not in the charging mode, and the indication message is used to indicate that certain software needs to be upgraded.

In one embodiment, as shown in FIG. 4, the first determining module 102 may also include: a third determining unit 1026, a fourth determining unit 1028, and a second updating unit 1030. The third determining unit 1028 is configured to determine whether the mobile terminal is connected to the server through a Wi-Fi network. The fourth determining unit 1028 is configured to determine whether the mobile terminal currently has sufficient battery power to sustain the complete download of the corresponding update package of the to-be-updated software. The second updating unit 1030 is configured to perform the update processing on the internal software installed in the mobile terminal when the mobile terminal is connected through a Wi-Fi network to the server and the mobile terminal currently has sufficient battery power to sustain the complete download of the corresponding update package of the to-be-updated software.

It should be noted that, the preferred modes of operation and interactions between various modules and respective units as shown in FIG. 3 and FIG. 4 can be found in the embodiments illustrated in FIG. 1 and FIG. 2, and the detailed descriptions are not mentioned herein.

According to one embodiment of the present invention, an apparatus for an internal software updating of the mobile terminal is provided. It should be noted that, in the apparatus described below, the same or equivalent components, elements or steps as those in the system described above are briefly described in the following, and detailed disclosure may be understood by referring to the above disclosure.

The apparatus for the internal software updating of the mobile terminal may include: a detecting module for detecting a network connection state of the mobile terminal and the current running mode of the mobile terminal in a regular time interval; a first determining module according to the detected network connection status and the running mode to determine whether to perform the update processing on the internal software installed in the mobile terminal. When the mobile terminal is connected to the server and the running mode of the mobile terminal allows for the software update, the first determining module performs the software update processing of the software installed inside the mobile terminal.

Thus, using the apparatus for the internal software updating of the mobile terminal according to the embodiments of the present invention, the problems of costing data volume and battery power consumption when updating the software update on a mobile terminal can be solved and, thus, lowers the complexity for software updating and makes the software updating more energy efficient, more environmental friendly, and meeting user expectations.

According to one embodiment of the present invention, the first updating unit in the mobile terminal sends a software update request to the server when the mobile terminal is connected to the server by the Wi-Fi network and currently in the charging mode, wherein software update request carries the name and version number of the to-be-updated software. Thus, on the server side, the server can compare the name and the version number of the software and optionally push the software to the mobile terminal.

According to one embodiment of the present invention, the apparatus further comprises: a second receiving module, which is configured to receive from the server the update package corresponding to the name of the software and to store the update package in the mobile terminal; a sorting module, which is configured to rearrange the update package corresponding to each to-be-updated software in the order of the updating time of each to-be-updated software; an installation module, which is configured to install the corresponding update package of each to-be-updated software in the rearranged order.

Further, the apparatus may further include: a display module, which is configured to display an indication message when the mobile terminal is not connected to the server through a Wi-Fi network and/or the mobile terminal is not currently in charging mode, wherein the indication message is used to indicate that certain software in the mobile terminal needs to be updated.

According to another embodiment of the present invention, the first determining module further comprises: a third determining unit configured to determine whether the mobile terminal is connected to the server through a Wi-Fi network; a fourth determining unit configured to determine whether the mobile terminal has sufficient battery power to sustain the complete download of the corresponding software update package of the software installed inside the mobile terminal according to the model or type of the mobile terminal; a second updating unit configured to perform the update processing on the software installed inside the mobile terminal when the mobile terminal is connected to the server through a Wi-Fi network and the mobile terminal has sufficient battery to sustain the complete download of the corresponding software update package of the software installed inside the mobile terminal.

According to one embodiment of the present invention, a mobile terminal is also provided. The mobile terminal may include: one or more processors and memory. The memory is configured to store one or more programs arranged to be executed by one or more processors, and the program comprises the instructions, which are executed to: detect the network connection condition between the mobile terminal and the server and the current running mode of the mobile terminal in a regular time interval; based on the detected network connection condition and the current running mode to determine whether to perform the update processing on the internal software installed in the mobile terminal, wherein the internal software installed in the mobile terminal is updated when the mobile terminal is connected to the server and the running mode of the mobile terminal allows for the software update. Further, in the mobile terminal according to an embodiment of the present invention, the memory further stores a program for executing the above-described corresponding update command, for brevity, the detailed description is omitted here.

It should be noted that the interactions between the various modules, and/or the individual units, which can be found in the embodiments shown in FIG. 1 and FIG. 2, and the descriptions are not provided in detail here.

Further, it should be noted that the above methods according to the present invention may be realized in the form of executable instructions by the mobile-terminal on a computer-readable storage medium. The "computer-readable storage medium", for the purpose of this specification, can be any apparatus which can contain, store, communicate, propagate, or transport the program to be used by instruction execution system, apparatus, or devices, or a combination thereof. More specifically, non-limiting examples of the computer-readable medium include the followings: an electrical connection portion (electronic device) with one or more wires, a portable computer diskette cartridge (magnetic device), a random access memory (RAM), read only memory (ROM), erasable read-only programmable memory (EPROM or Flash memory), an optical fiber device, and a portable compact disc read-only memory (CDROM). Further, the computer-readable medium could even be paper or another suitable medium upon which the program is printed, as, for example, the program may be obtained by optical scanning, and then editing, interpreting or when necessary in other suitable way to electronically processing the paper or other medium, and then stored in a computer memory.

From the above description, it can be seen, the above described embodiments achieve the following technical effects (to be noted that these effects are effects that can be achieved by certain preferred embodiments): reducing the complexity of the software updates, and more energy-saving and environment friendly, and meeting the user's expectations.

Obviously, those skilled in the art would understand that the disclosed modules or steps can be implemented in general-purpose computing devices, they may be assembled in a single computing device, or be distributed in a network of many computing devices. Preferably, the disclosed modules or steps may also be implemented in an executable program code of the computing device, which can be stored in a storage device and be executed by the computing device. Under certain circumstances, the steps disclosed in the present invention may be executed in the order other than those illustrated and described above. The disclosed modules and steps may also be implemented respectively in an integrated circuit module, or by combining various modules or steps in one single integrated circuit module. Thus, the present invention is not limited or restricted to any particular hardware and software combinations.

Furthermore, it should be understood that various aspects of the invention may be implemented in hardware, software, firmware, or a combination thereof. In the above embodiments, a plurality of steps or methods may be implemented in software or firmware stored in a memory and executed by an appropriate instruction executing system. For example, if implemented in hardware, as in another embodiment, it can be achieved by any following known techniques or a combination thereof: a discrete logic circuit implementing a logic function of a logic gate on a data signal, an ASIC with suitable combination of logic gates, a programmable gate array (PGA), and a field programmable gate array (FPGA), etc.

In the present specification, the term "an embodiment", "certain embodiments", "illustrative embodiment," "an example", "a specific example", or "some/certain examples" means that the particular features, structures, materials, or characteristics described in the embodiments or examples are included in at least one embodiment or example of the present invention. In the present specification, the illustrative descriptions of the above terms are not necessarily referring to the same embodiment or example. Furthermore, the particular features, structures, materials, or characteristics described may be combined in a suitable manner in any one or more embodiments or examples.

While the embodiments of the present invention are shown and described, one of the ordinary skill in the art can understand that, without departing from the principles and spirit of the present invention, various changes, modifications, substitutions and variations may be made in these embodiments, and the scope of the invention is indicated by the claims and their equivalents.

What is claimed:

1. An internal software updating method for a mobile terminal, comprising: periodically determining whether the mobile terminal is simultaneously connected with a Wi-Fi network and in a charging mode every preset fixed time interval; when a Wi-Fi network connection is detected, and the mobile terminal is not charging: determining a threshold data size based on a power consumption factor and according to a type or a model of the mobile terminal, the threshold data size further being an amount of data that can be downloaded within a preset time duration according to a bandwidth of a currently connected Wi-Fi network, wherein the threshold data size is determined to be 20 megabytes, when an overall size of a plurality of update packages corresponding to a plurality of to-be-updated software is less than the threshold data size of 20 megabytes, automatically performing an update processing, and when the overall size of the plurality of update packages is larger than the threshold data size of 20 megabytes, prompting a user of the mobile terminal to plug in a power adapter to update software; receiving, by the mobile terminal, the plurality of update packages from a server and storing the received update packages; automatically rearranging, by the mobile terminal, corresponding update package of each to-be-updated software in an order of updating time of each to-be-updated software and caching the rearranged, updated packages in a cache memory; and sequentially installing, by the mobile terminal, the update package corresponding to each to-be-updated software in the rearranged order.

2. The method according to claim 1, wherein performing the update processing further includes: receiving, by the server, a software update request from the mobile terminal, wherein the software update request carries a name and a version number of a to-be-updated software; determining, by the server, a version number of a corresponding update software stored in the server according to the name of the to-be-updated software; comparing the version number determined by the server with the version number received by the server; and when the two version number are not the same, delivering, by the server, an update package corresponding to the to-be-updated software to the mobile terminal, wherein the mobile terminal performs the update processing on the to-be-updated software according to the update package.

3. The method according to claim 1, further including: displaying an indication message on the mobile terminal when the mobile terminal is not connected through a Wi-Fi network to the server or the mobile terminal is not in the charging mode, wherein the indication message is used to indicate that software in the mobile terminal needs to be updated.

4. The method according to claim 1, further including: determining, by the mobile terminal, whether the mobile terminal is connected to the server by a Wi-Fi network; according to a type or a model of the mobile terminal, estimating in advance a battery power consumption needed for a complete download of the update packages of the internal software installed in the mobile terminal; obtaining a current battery power value of the mobile terminal; and determining that the mobile terminal has a sufficient battery power, when the mobile terminal is not charging and the current battery power of the mobile terminal is above a preset threshold related to the battery power consumption needed for the complete download; and performing, by the mobile terminal, the update processing on the internal software installed in the mobile terminal when the mobile terminal is connected to a server through the Wi-Fi network and the mobile terminal has sufficient battery power to sustain the complete download of the update package of the internal software installed in the mobile terminal.

5. An internal software updating system, comprising: a server; and a mobile terminal, wherein the mobile terminal includes: a detecting module configured to periodically detect whether the mobile terminal is simultaneously connected with a Wi-Fi network and in a charging mode every preset fixed time interval; a first determining module configured to: when a Wi-Fi network connection is detected, and the mobile terminal is not charging, determine a threshold data size based on a power consumption factor and according to a type or a model of the mobile terminal, the threshold data size further being an amount of data that can be downloaded within a preset time duration according to a bandwidth of a currently connected Wi-Fi network, wherein the threshold data size is determined to be 20 megabytes, when an overall size of a plurality of update packages corresponding to a plurality of to-be-updated software is less than the threshold data size of 20 megabytes, automatically perform an update processing, and when the overall size of the plurality of update packages is larger than the threshold data size of 20 megabytes, prompt a user of the mobile terminal to plug in a power adapter to update software; a second receiving module configured to receive the plurality of update packages from the server and store the received update packages; a sorting module configured to automatically rearrange corresponding update package of each to-be-updated software in an order of updating time of each to-be-updated software and cache the rearranged, updated packages in a cache memory; and an installation module configured to sequentially install the plurality of update packages corresponding to each to-be-updated software in the rearranged order.

6. The system according to claim 5, wherein the server includes: a first receiving module configured to receive a software update request from the mobile terminal, wherein the software update request carries a name and a version number of a to-be-updated software; a second determining module configured to determine a version number of a corresponding update software stored in the server according to the name of the to-be-updated software; a comparison module configured to compare the version number determined by the server with the version number received by the server; and a delivering module configured to, when the two version number are not the same, an update package corresponding to the to-be-updated software to the mobile terminal.

7. The system according to claim 6, wherein the mobile terminal performs the update processing on the to-be-updated software according to the update package.

8. The system according to claim 5, wherein the mobile terminal also includes: a display module configured to display an indication message on the mobile terminal when the mobile terminal is not connected through a Wi-Fi network to the server or the mobile terminal is not in the charging mode, wherein the indication message is used to indicate that software in the mobile terminal needs to be updated.

9. The system according to claim 5, wherein, the first determining module also includes: a third determining unit configured to determine whether the mobile terminal is connected to the server by a Wi-Fi network; a fourth determining unit configured to, according to a type or a model of the mobile terminal, estimate in advance a battery power consumption needed for a complete download of the update packages of the internal software installed in the mobile terminal; obtain a current battery power value of the mobile terminal; and determine that the mobile terminal has sufficient battery power, when the mobile terminal is not charging and the current battery power of the mobile terminal is above a preset threshold related to the battery power consumption needed for the complete download; and a second updating unit configured to perform the update processing on the internal software installed in the mobile terminal when the mobile terminal is connected to a server through the Wi-Fi network and the mobile terminal has sufficient battery power to sustain the complete download of the update package of the internal software installed in the mobile terminal.

10. An internal software updating apparatus, comprising: a detecting module configured to periodically detect whether a mobile terminal is simultaneously connected with a Wi-Fi network and in a charging mode every preset fixed time interval; a first determining module configured to: when a Wi-Fi network connection is detected, and the mobile terminal is not charging, determine a threshold data size based on a power consumption factor and according to a type or a model of the mobile terminal, the threshold data size further being an amount of data that can be downloaded within a preset time duration according to a bandwidth of a currently connected Wi-Fi network, wherein the threshold data size is determined to be 20 megabytes, when an overall size of a plurality of update packages corresponding to a plurality of to-be-updated software is less than the threshold data size of 20 megabytes, automatically perform an update processing, and when the overall size of the plurality of update packages is larger than the threshold data size of 20 megabytes, prompt a user of the mobile terminal to plug in a power adapter to update software; a second receiving module configured to receive the plurality of update packages from a server and store the received update packages; a sorting module configured to automatically rearrange corresponding update package of each to-be-updated software in an order of updating time of each to-be-updated software and cache the rearranged, updated packages in a cache memory; and an installation module configured to sequentially install the plurality of update packages corresponding to each to-be-updated software in the rearranged order.

11. The apparatus according to claim 10, wherein: the first updating unit is configured to send a software update request to the server when the mobile terminal is connected to the server through a Wi-Fi network and the mobile terminal is in the charging mode, wherein the software update request carries a name and a version number of a to-be-updated software.

12. The apparatus according to claim 10, further including: a display module configured to display an indication message on the mobile terminal when the mobile terminal is not connected through a Wi-Fi network to the server or the mobile terminal is not in the charging mode, wherein the indication message is used to indicate that software in the mobile terminal needs to be updated.

13. The apparatus according to claim 10, wherein, the first determining module also includes: a third determining unit configured to determine whether the mobile terminal is connected to the server by a Wi-Fi network; a fourth determining unit configured to, according to a type or a model of the mobile terminal, estimate in advance a battery power consumption needed for a complete download of the update packages of the internal software installed in the mobile terminal; obtain a current battery power value of the mobile terminal; and determine that the mobile terminal has sufficient battery power, when the mobile terminal is not charging and the current battery power of the mobile terminal is above a preset threshold related to the battery power consumption needed for the complete download; and a second updating unit configured to perform the update processing on the internal software installed in the mobile terminal when the mobile terminal is connected to a server through the Wi-Fi network and the mobile terminal has sufficient battery power to sustain the complete download of the update package of the internal software installed in the mobile terminal.

14. A non-transitory computer-readable storage medium containing executable computer program instructions for, when executed on a mobile terminal, performing an internal software updating method, the method comprising: periodically determining whether the mobile terminal is simultaneously connected with a Wi-Fi network and in a charging mode every preset fixed time interval; when a Wi-Fi network connection is detected, and the mobile terminal is not charging: determining a threshold data size based on a power consumption factor and according to a type or a model of the mobile terminal, the threshold data size further being an amount of data that can be downloaded within a preset time duration according to a bandwidth of a currently connected Wi-Fi network, wherein the threshold data size is determined to be 20 megabytes, when an overall size of a plurality of update packages corresponding to a plurality of to-be-updated software is less than the threshold data size of 20 megabytes, automatically performing an update processing, and when the overall size of the plurality of update packages is larger than the threshold data size of 20 megabytes, prompting a user of the mobile terminal to plug in a power adapter to update software; receiving, by the mobile terminal, the plurality of update packages from a server and storing the received update packages; automatically rearranging, by the mobile terminal, corresponding update package of each to-be-updated software in an order of updating time of each to-be-updated software and caching the rearranged, updated packages in a cache memory; and sequentially installing, by the mobile terminal, the update package corresponding to each to-be-updated software in the rearranged order.

15. The non-transitory computer-readable storage medium according to claim 14, wherein performing the update processing further includes: receiving, by the server, a software update request from the mobile terminal, wherein the software update request carries a name and a version number of a to-be-updated software; determining, by the server, a version number of a corresponding update software stored in the server according to the name of the to-be-updated software; comparing the version number determined by the server with the version number received by the server; and when the two version number are not the same, delivering, by the server, an update package corresponding to the to-be-updated software to the mobile terminal, wherein the mobile terminal performs the update processing on the to-be-updated software according to the update package.

16. The non-transitory computer-readable storage medium according to claim 14, wherein the method further includes: displaying an indication message on the mobile terminal when the mobile terminal is not connected through a Wi-Fi network to the server or the mobile terminal is not in the charging mode, wherein the indication message is used to indicate that software in the mobile terminal needs to be updated.

17. The non-transitory computer-readable storage medium according to claim 14, wherein the method further includes: determining whether the mobile terminal is connected to the server by a Wi-Fi network; according to a type or a model of the mobile terminal, estimating in advance a battery power consumption needed for a complete download of the update packages of the internal software installed in the mobile terminal; obtaining a current battery power value of the mobile terminal; and determining that the mobile terminal has a sufficient battery power, when the mobile terminal is not charging and the current battery power of the mobile terminal is above a preset threshold related to the battery power consumption needed for the complete download; and performing the update processing on the internal software installed in the mobile terminal when the mobile terminal is connected to a server through the Wi-Fi network and the mobile terminal has sufficient battery power to sustain the complete download of the update package of the internal software installed in the mobile terminal.

18. The method according to claim 1, further comprising: determining whether the mobile terminal is associated with a monthly or yearly data plan; in response to determining that the mobile terminal is associated with a monthly or yearly data plan, determining whether there is enough unused data volume; and in response to determining that there is enough unused data volume, automatically performing the update processing.

19. The system according to claim 5, wherein the first determination module is further configured to: determine whether the mobile terminal is associated with a monthly or yearly data plan; in response to determining that the mobile terminal is associated with a monthly or yearly data plan, determine whether there is enough unused data volume; and in response to determining that there is enough unused data volume, automatically perform the update processing.

20. The non-transitory computer-readable storage medium according to claim 14, wherein the method further includes: determining whether the mobile terminal is associated with a monthly or yearly data plan; in response to determining that the mobile terminal is associated with a monthly or yearly data plan, determining whether there is enough unused data volume; and in response to determining that there is enough unused data volume, automatically performing the update processing.

* * * * *